Figure 1:
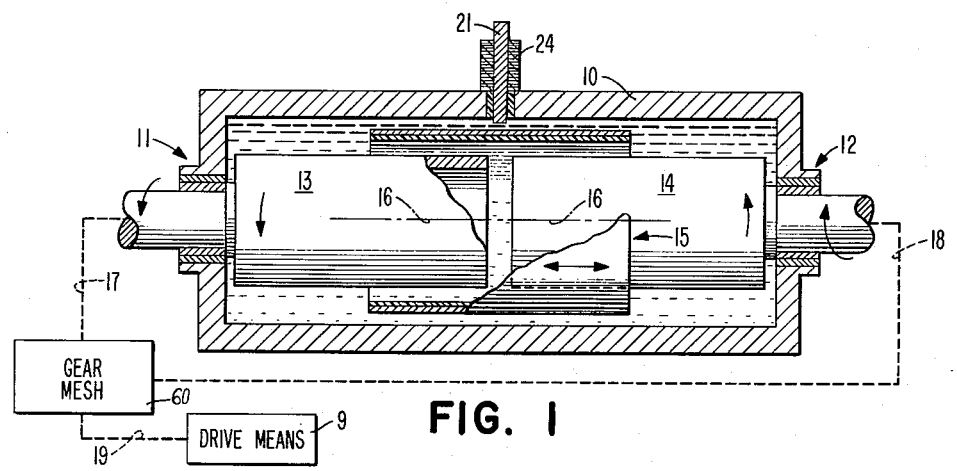

July 25, 1961 R. J. ORRANGE 2,993,382
INTEGRATING ACCELEROMETER WITH DIGITAL READOUT
Filed June 25, 1959

INVENTOR.
ROBERT J. ORRANGE
BY Ralph R. Barnard
ATTORNEY

Patented July 25, 1961

2,993,382

2,993,382
INTEGRATING ACCELEROMETER WITH DIGITAL READOUT

Robert J. Orrange, Apalachin, N.Y., assignor to International Business Machines Corporation, New York, N.Y., a corporation of New York
Filed June 25, 1959, Ser. No. 822,904
5 Claims. (Cl. 73—490)

This invention relates to improvements in means for measuring linear acceleration and more particularly to a new and improved viscous fluid float type accelerometer.

Accelerometers have wide application in control system arts for measuring the linear acceleration of a body in motion. One of the means for measuring the linear acceleration of a mechanical body or vehicle (such as an aircraft) is a viscous fluid float type accelerometer. Viscous fluid float type accelerometers are often used in navigational guidance systems using attitude stabilized platforms where it is desired to have a high order of accuracy and, at the same time, keep the volume and weight of the equipment to a minimum. Digital computational techniques are utilized in many of the present day navigational guidance systems, and the outputs of the accelerometers associated therewith must be converted from analog to digital information before they may be used. The present invention is concerned with providing a viscous fluid float type accelerometer having a digital type output rather than an analog output, which would require further apparatus to provide the necessary conversion.

Viscous fluid float type integrating accelerometers are presently being used for providing an electrical output on attitude stabilized platforms commensurate with the integrated acceleration of the platform in the direction of an axis along which the accelerometer is mounted. Briefly, this prior art integrating accelerometer comprises a shell or outer cylinder adapted to contain a viscous fluid, which is mounted with its longitudinal axis in coincidence with the axis along which it is desired to measure linear acceleration. In addition, a smaller inner cylinder is mounted within this outer shell, so that it may be rotated about the common axis of the cylindrical shell. Finally, an annular float of less length than the inner and outer shells is floated therebetween with predetermined interior and exterior clearances in a manner so that it is displaced along the common axis in accordance with the integral of the acceleration being measured. The centrifugal forces generated within the fluid by the rotation of the inner cylindrical shell act to maintain the axis of the annular float in alignment with the common axis.

The prior art uses several techniques for determining the instantaneous displacement of the annular float from its initial position. One method is to divide the outer shell or cylinder into two equal sections, and the point of division functions as a reference in initially positioning the annular float. By making the float and the outer and inner shells of conducting material and selecting a viscous fluid which has insulating properties, two capacitors are formed which operate in a manner so that the capacity of each is dependent upon the surface area of the annular float, which cooperates with each section of the outer shell. These two capacitors may then be connected to an A.C. bridge arrangement, which will have an unbalance in accordance with the displacement of the float from its neutral or reference position. The voltage unbalance of the bridge will be commensurate with the magnitude of the displacement from the neutral position, and the phase of the voltage will be commensurate with the direction of the displacement from the neutral position.

Since the output from this viscous float type accelerometer is analog in nature and must be converted to digital information before it may be used in many of the present day navigational guidance systems, further equipment is required to perform this function. Conversion equipment of this type, having the necessary degree of accuracy, tends to be of relatively large volume and weight. Therefore, considerable engineering advantage would result if the direct accelerometer output was of the pulse or digital type.

The teachings of the present invention are directed toward providing a viscous float type accelerometer similar to the type described hereinabove with sufficient modification to provide this desirable digital output directly. Specifically, the inner cylinder is divided into two rotatable portions or drums, each journalled in one of the end sections of the outer shell or cylinder, which remains fixed. When each of these rotatable drums is driven at a constant rotational velocity, the annular float aligns itself along the axis of rotation of the drums corresponding to the axis along which the acceleration is to be measured. As the annular float is displaced in the direction of the axis of rotation of the drums in accordance with the time integral of the acceleration being measured, the float is rotated at a rate determined by the magnitude of the displacement. The direction of rotation corresponds to the direction of the displacement and the acceleration to be measured.

This rotation of the annular float is a result of opposing torques being applied thereto by the viscous coupling derived by the fluid and the counter rotation of two drum portions. The opposing torques become unequal whenever the area of the annular float adjacent each rotational drum becomes unequal. Since the float is axially positioned according to the time integral of the acceleration being measured, the resultant torque acting on the float is also directly proportional to the time integral of the acceleration. This rotating annular float may then be utilized to generate pulses having a frequency which is determined by the time integral of the acceleration (velocity along the spin axis). These pulses may be generated in a manner such that the direction of rotation of the float and the acceleration is indicated.

It is, therefore, a primary object of the present invention to provide a new and improved means for measuring linear acceleration.

It is an other object of the present invention to provide a new and improved viscous fluid float type accelerometer.

It is an additional object of the present invention to provide a new and improved viscous fluid float type accelerometer that provides a digital output.

It is still another object of the present invention to provide a new and improved viscous fluid float type accelerometer wherein the float rotates about the axis along which the acceleration is being measured at a rate proportional to the time integral of the acceleration.

It is another object of the present invention to provide a new and improved viscous fluid float type accelerometer wherein the float rotates about the axis along which the acceleration is being measured in a direction corresponding to the direction of acceleration.

Other objects of the invention will be pointed out in the following description and claims and illustrated in the accompanying drawings which disclose, by way of examples, the principle of the invention and the best mode which has been contemplated of applying that principle.

Figure 2:
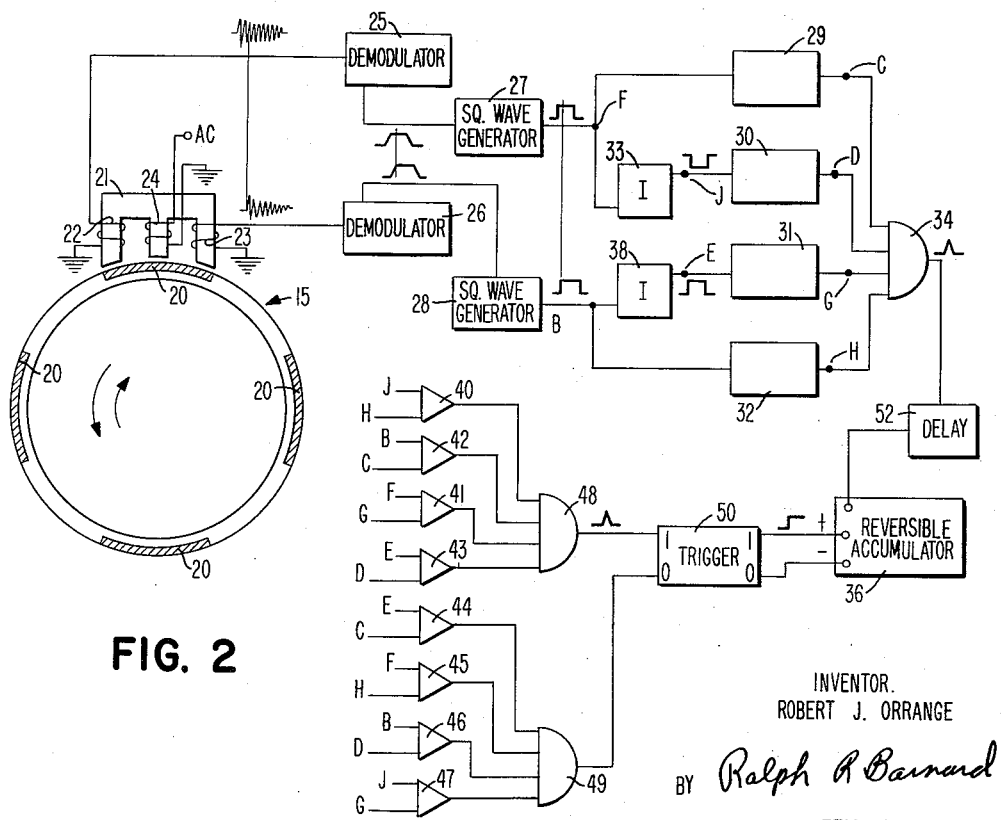

In the drawings:

FIG. 1 shows a longitudinal cross section of the mechanical arrangement of a viscous fluid float type accelerometer constructed according to the teachings of the present invention; and FIG. 2 shows an electrical schematic of an exemplary electronic digital readout utilizing an E type transformer pickup.

Referring to FIG. 1, there is shown a sealed cylindrical chamber 10 having end sections 11 and 12, respectively, which functionally act as a journal. Mounted within end section 11 is a rotatable drum 13 having a length which is somewhat less than half the length of the cylindrical chamber 10. Mounted within end section 12 is a rotatable drum 14 having the same proportions as drum 13. Drums 13 and 14 are shown having hollow construction. However, their internal construction is a matter of choice. When a viscous fluid is utilized to fill the sealed chamber and an annular float 15 is emersed as shown, the rudiments of a prior art viscous fluid float type accelerometer as described hereinabove are present.

As shown, this instrument consists basically of a cylindrical annular float element 15 buoyant within a viscous fluid and arranged to have a single degree of linear motion along the axis 16 of the fluid filled chamber. Accordingly, on the occurrence of an acceleration A along axis 16, the annular float 15 is subjected to a force $Fa$, which may be represented by the following equation:

$$Fa = m_b A \quad (1)$$

where $m_b$ is equal to the buoyant mass of the annular float 15, which is in turn equal to the mass of the fluid displaced by the float minus the mass of the float.

Moreover, during steady state conditions, the only force $Fo$ which opposes $Fa$ is that provided by the viscous restraint of the fluid and may be represented by the following equation:

$$Fo = K \frac{dx}{dt} \quad (2)$$

where K is a constant incorporating the viscosity of the fluid plus the physical dimensions of the float relating to the viscous restraint and $$\frac{dx}{dt}$$

corresponds to the first derivative of the displacement of the float 15 from its initial axial position within the sealed chamber.

As a result of equating Equations 1 and 2, the following differential is obtained representing the steady state condition:

$$\frac{dx}{dt} = A \frac{m_b}{K} \quad (3)$$

A solution of Equation 3 may be represented by:

$$\int_{t_1}^{t_2} A \, dt = \frac{K}{m_b} \Delta x \quad (4)$$

where $\Delta x$ is the incremental displacement of the float 15.

According to Equation 4 and because $K/m_b$ may be said to be constant, the axial displacement of buoyant element 15 is directly proportional to the time integral of the applied acceleration. In order for Equations 1, 2, 3 and 4 to be representative of the steady state operation of the viscous fluid float type accelerometer, the center axis of the float 15 must coincide with the longitudinal axis 16 of the sealed chamber. The prior art viscous fluid float type accelerometer provided this by rotating or spinning either the inner or outer shell around its longitudinal axis, so that a centrifugal force would be created to cause the float element within the chamber to seek the same axis of rotation. Since the annular float element is cylindrical, its longitudinal axis will align itself with the spin axis of the sealed chamber 10. Moreover, when the buoyancy of the float element 15 is made substantial, the centrifugal force can be made much greater than any anticipated external acceleration forces tending to disturb axial alignment.

This same alignment philosophy is present within the teachings of the present invention by rotating drums 13 and 14 at a substantial rotational velocity. Specifically, drum 13 is rotated via shaft 17 in a clockwise direction, and drum 14 is rotated in a counter-clockwise direction via shaft 18 from a common drive shaft 19 and drive means 9 through a gear mesh 60. Rotating drums 13 and 14 then act through the viscous fluid within the chamber 10 to derive centrifugal forces perpendicular to the axis of rotation, which acts on annular float 15 so that its axis will be aligned with axis 16 of the chamber.

In addition to the above-referred to centrifugal forces, other forces are present within the viscous fluid which result in a viscous coupling between the annular float 15 and each of the rotating drums 13 and 14, respectively. This viscous coupling may be characterized in terms of a torque.

The torque $T14$ exerted on float 15 by drum 14 may be represented by the following equation:

$$T14 = K(a14) \quad (5)$$

where K is a constant which is determined by the viscosity of the fluid, the constant rotational velocity of drum 14 and the effective radius of the viscous force causing the torque; and $(a14)$ is a variable representative of the area of drum 14 which is adjacent to the annular float 15.

It is important to note that this area $(a14)$ will vary with the displacement (position) of float 15 which is in turn determined by the time integral of the linear acceleration which is being measured along axis 16. The direction of $T14$ is determined by the direction of rotation of drum 14 and is represented in FIG. 1 by an arrow as being in the counter-clockwise direction.

Similarly, the torque $T13$ exerted on float 15 by drum 13 may be represented by the following equation:

$$T13 = K(a13) \quad (6)$$

where K is a constant which is determined by the velocity of the fluid, the constant rotational velocity of drum 13 and the effective radius of the viscous force causing the torque; and $(a13)$ is a variable representative of the area of drum 13 which is adjacent to the annular float 15.

Area $(a13)$ will vary with the displacement of float 15 which is in turn determined by the time integral of the linear acceleration, which is being measured along axis 16. The direction of $T13$ is determined by the direction of rotation of drum 13 and is represented in FIG. 1 by an arrow as being in the clockwise direction.

Because torques $T13$ and $T14$ simultaneously applied to float 15 are in opposing directions, float 15 will rotate in a direction and at a rotational velocity, which is determined by the instantaneous difference. Inspection of both Equations 5 and 6 will indicate that the resultant torque $Tr$ may be represented by the following equation:

$$Tr = K(a14 - a13) \quad (7)$$

It should be noted that K within both Equations 5 and 6 are the same term.

When the viscous fluid float type accelerometer according to the teachings of the present invention is in its initial condition, both areas $(a14)$ and $(a13)$ are equal and there is no torque applied to float 15. However, if float 15 is subjected to linear acceleration along axis 16 in one direction, $(a14)$ will become larger than $(a13)$ in accordance with the time integral of the linear acceleration, and a resultant torque is applied to the float. Because of the resultant torque, float 15 will be rotated in a direction and at a rotational velocity commensurate with the time integral of the linear acceleration being measured. The rotating float may be readily utilized as a means for digitizing the output of the accelerometer for use in an associated digital system. While, according to the prior art technique, the float was displaced in the direction of the linear acceleration being measured, the present invention contemplates that the float is also rotated at a rate and in a direction commensurate with that displacement.

Many techniques are available for measuring the direction and rotational velocity of float 15, and the selection of one over another would be determined by the practical considerations present in the system application. One example is shown in FIG. 2 wherein an integral number of strips 20 of magnetic material are embedded within the float on its periphery with non-magnetic portions of equal width therebetween. As will be made more clear hereinafter, the number of magnetic strips 20 which are placed on the periphery of the annular float 15 determines the resolution obtained in the generation of pulses representative of the direction and rotational velocity of the float.

FIG. 2 shows an E transformer type pickup 21 placed adjacent the annular float for the purpose of deriving these electrical pulses. Therein, a winding 24 is placed around the middle leg and is connected to an A.C. power supply. Similarly, the two outer legs each have an output winding 22 and 23. One terminal of windings 22 and 23 is grounded, and the other terminal is applied to demodulators 25 and 26, respectively. As shown, a segment 20 is in a position so that each of the outer legs of the E transformer 21 has a low reluctance path with the center leg, and the output voltages induced in windings 22 and 23 are of a maximum amplitude. However, as the segment 20 and float 15 move by the E transformer pickup 21, the reluctance of the outer legs changes, and the voltages induced in windings 22 and 23 are modulated accordingly.

As a complete segment 20 and an adjacent non-magnetic portion move pass the E transformer pickup, the magnitude of the induced A.C. voltage within winding 22 changes from a large to a small amplitude and then from a small to a large amplitude. Meanwhile, the magnitude of the induced voltage within winding 23 changes from a small to a large amplitude and then from a large to a small amplitude. As those skilled in the art will recognize, these changes in the amplitude of the voltages within windings 22 and 23 will be shifted in time phase with respect to one another by the amount of time required for one-half of segment 20 to pass a particular reference point on E transformer pickup 21. Accordingly, the output from windings 22 and 23 each comprise an amplitude modulated A.C. carrier (at the frequency of the voltage being applied to winding 24) with one envelope being phase shifted, as shown by the exemplary waveform.

The modulated A.C. carrier output from winding 22 is then passed through a demodulator 25 which produces a D.C. voltage commensurate with its envelope. Similarly, the voltage output from winding 23 is applied to a demodulator 26 to provide a D.C. voltage having the magnitude varying with its envelope.

Phase sensitive detectors which will perform the functions of each of demodulators 25 and 26 are well known to those skilled in the art and are exemplified by the detector shown in FIG. 14.11, page 511, of a textbook entitled Waveforms, Radiation Laboratory Series, volume 19, McGraw-Hill Book Company, Inc., New York, N.Y., 1949.

In order to provide a voltage pulse each time the output from either winding 22 or winding 23 changes its magnitude, further means are provided within each channel to sharpen the amplitude changes of the output from the demodulator and then differentiate the resulting square wave. For example, the demodulator 25 is shown connected to a square wave generator 27. The output of the square wave generator 27 is then passed through a first differentiating circuit 29 over one channel and to another differentiating circuit 30 over another channel through an inverter 33. Because of the differentiating action of differentiating circuit 29, the positive voltage rise square wave output of demodulator 27 provides a positive pulse to OR circuit 34. Because of the inversion and differentiating action of inverter 33 and differentiating circuit 30, respectively, the negative going portion of the square wave output of the square wave generator 27 also provides a positive pulse to OR circuit 34 later in time.

Similarly, as a result of the differentiating action of differentiating circuit 32, a positive pulse is applied to OR circuit 34 in response to the positive rise of the square wave output of square wave generator 28. As a result of the inverting and differentiating actions of inverter 38 and differentiating circuit 31, respectively, a positive pulse is applied to OR circuit 34 on the occurrence of a negative going change in the square wave output of square wave generator 28. In summary, as a complete segment 20 and an adjacent non-magnetic portion move pass the E transformer pickup, four positive pulses are generated at a rate which is commensurate with the rotational velocity of the annular float and the time integral of the acceleration along axis 16 being measured.

Square wave generators 27 and 28 are conventional and may be exemplified by the Schmitt trigger shown in FIGS. 14–16, page 427, of a textbook entitled Active Networks, by Vincent C. Rideout, Prentice Hall, Inc., New York, N.Y., 1954. Differentiating circuits 29—32 may comprise any of the well known differentiating means exemplified by a resistance capacitor network. The "OR" circuits referred to herein are of the type which provide a positive voltage level output or pulse when any of the inputs have a positive voltage level or pulse applied thereon. The "AND" circuits referred to herein are of the type which provide a positive voltage level output or pulse when all of the inputs have a positive voltage level or pulse applied thereon.

If it is desired to integrate these pulses for the purpose of measuring the distance travelled by the vehicle in which the accelerometer is mounted in a direction which corresponds to axis 16, the output of OR circuit 34 may be connected to the input of a reversible accumulator 36 which is of conventional design. The capacity of reversible accumulator 36 will be determined by the system application requirement and the resolution selected in determining the number of segments 20 which are placed on the annular float 15.

Reversible accumulator 36 may comprise, by way of example, the counter shown in a portion of FIG. 14 on page 13 of the IBM Journal of Research and Development, volume 2, Number 1, January 1958.

The delay placed between OR circuit 34 and reversible accumulator 36 is necessary because further logic circuitry, to be discussed hereinafter, must have sufficient time to maintain accumulator 36 in an add or subtract condition depending upon the direction of the acceleration along axis 16 of the accelerometer and the direction of rotation of the annular float 15.

Plural output windings 22 and 23 are utilized for the purpose of providing high resolution information as to the rotational velocity of float 15 and generating information as to the direction of rotation of float 15, so as to control whether the reversible digital accumulator 36 adds or subtracts the positive pulses' output of OR circuit 34. For example, when the voltage induced in winding 23 has a large amplitude, a change in the induced voltage level within winding 22 from a low to high should be interpreted as a counter-clockwise rotation of float 15, and the positive pulse generated in the output of OR circuit 34 should be added to the reversible accumulator 36. In order to provide for this type of operation, whenever the voltage induced in winding 23 has a large amplitude, the voltage level at terminal B and one input of AND circuit 42 will be at an up level. Therefore, when the induced voltage level within winding 22 changes from low to high, a positive pulse is generated at terminal C and is applied to the other input of AND circuit 42. As a result, a positive pulse is then passed through OR circuit 48 and applied to trigger 50, which drives its one output terminal to an up level so as to place reversible accumulator 36 in its summing mode. At the same time, the positive pulse generated at terminal C will pass through OR circuit 34 and delay 52 in a manner so as to apply an input pulse to summing accumulator 36. The time delay provided by delay 52 should be sufficient to give reversible accumulator 36 a chance to be switched to its summing mode, if necessary.

Similarly, when the voltage induced in winding 23 is at an up level, a change in the induced voltage level within winding 22 from high to low should be interpreted as a counter-clockwise rotation of float 15. The positive pulse generated in the output of differentiating circuit 30 and OR circuit 34 should be subtracted from the reversible accumulator 36.

Whenever the voltage induced in winding 23 has a large amplitude, the voltage level at terminal B and one input of AND circuit 46 will be at an up level. Therefore, when the induced voltage level within winding 22 changes from high to low, a positive pulse is generated at terminal D and applied to the other input of AND circuit 46. As a result, a positive pulse is then passed through OR circuit 49 and applied to the zero input terminal of conventional trigger 50, which acts to drive its one output terminal to an up voltage level condition and place reversible accumulator 36 in its subtracting mode. At the same time, the positive pulse generated at terminal D will pass through OR circuit 34 and delay 52 in a manner so as to apply an input pulse to summing accumulator 36.

When the voltage induced in winding 23 is at a low level, a change in the induced voltage level within winding 22 from low to high should be interpreted as a clockwise rotation of float 15. The positive pulse generated in the output or OR circuit 34 should be subtracted from reversible accumulator 36. Whenever the voltage induced in winding 23 has a small amplitude, the voltage level at terminals E and one input of AND circuit 44 will be at an up level. Therefore, when the induced voltage level within winding 22 changes from low to high, a positive pulse is generated at terminal C and applied to the other input of AND circuit 44. As a result, a positive pulse is then passed through OR circuit 49 and applied to the zero input of trigger 50 for driving its zero output terminal to an up level and place reversible accumulator 36 in its subtracting mode. At the same time, the positive pulse generated at terminal C will pass through OR circuit 34 and delay 52 in a manner so as to apply an input pulse to summing accumulator 36.

When the voltage induced in winding 23 is at a low level, a change in the induced voltage level within winding 22 from high to low should be interpreted as a counter-clockwise rotation of float 15. The positive pulse generated in the output of differentiating circuit 30 and OR circuit 34 should be added to the reversible accumulator 36.

Whenever the voltage induced in winding 23 is at a low level, the voltage level at terminal E and one input of AND circuit 43 will be at an up level. Therefore, when the induced voltage level within winding 22 changes from high to low, a positive pulse is generated at terminal D and applied to the other input of AND circuit 43. As a result, a positive pulse is then passed through OR circuit 48 and applied to the one input terminal of trigger 50, so as to place reversible accumulator 36 in its swimming mode. At the same time, the positive pulse generated at terminal D will pass through OR circuit 34 and delay 52 in a manner so as to apply an input pulse to summing accumulator 36.

When the voltage induced in winding 22 is at a high level, a change in the induced voltage level within winding 23 from a high to low should be interpreted as a counter-clockwise rotation of float 15. The positive pulse generated in the output of differentiating circuit 31 and OR circuit 34 should be added to the reversible accumulator 36. Whenever the voltage induced in winding 22 has a large amplitude, the voltage level at terminal F and one input of AND circuit 41 will be at an up level. Therefore, when the induced voltage level within winding 23 changes from high to low, a positive pulse is generated at terminal G and applied to the other input terminal of AND circuit 41. As a result, a positive pulse is then passed through OR circuit 48 and applied to terminal 50, which drives its one output terminal to an up condition so as to place reversible accumulator 36 in its summing mode. At the same time, the positive pulse generated at terminal G is passed through OR circuit 34 and delay 52 in a manner so as to apply an input pulse to summing accumulator 36.

When the voltage induced in winding 22 has a large amplitude, a change in the induced voltage level within winding 23 from low to high should be interpreted as a counter-clockwise rotation of float 15. The positive pulse generated in the input of OR circuit 34 should be subtracted from reversible accumulator 36. In order to provide for this type of operation, whenever the voltage induced in winding 22 has a large amplitude, the voltage level at terminal F and one input of AND circuit 45 will be at an up level. Therefore, when the induced voltage level within winding 23 changes from low to high, a positive pulse is generated at terminal H and applied to the other input of AND circuit 45. As a result, a positive pulse is then passed through OR circuit 49 and applied to trigger 50, which drives its zero output terminal to an up level so as to place the accumulator 36 in its subtracting mode. At the same time, the positive pulse generated at terminal H will pass through OR circuit 34 and delay 52 in a manner so as to apply an input pulse to subtracting accumulator 36.

When the voltage induced in winding 22 is at a low level, a change in the induced voltage level within winding 23 from high to low should be interpreted as a clockwise rotation of float 15. The positive pulse generated in the output of differentiating circuit 31 and OR circuit 34 should be subtracted from the reversible accumulator 36. Whenever the voltage induced in winding 22 is at a low level, the voltage level at terminal J and one input of AND circuit 47 will be at an up level. Therefore, when the induced voltage level within winding 23 changes from high to low, a positive pulse is generated at terminal G and applied to the other input of AND circuit 47. As a result, a positive pulse is then passed through OR circuit 49 and applied to trigger 50 which drives its zero output terminal to an up level so as to place reversible accumulator 36 in its subtracting mode. At the same time, the positive pulse generated at terminal G will pass through OR circuit 34 and delay 52 in a manner so as to apply an input pulse to subtracting accumulator 36.

When the voltage induced in winding 22 is at a low level, a change in the induced voltage level within winding 23 from low to high should be interpreted as a counter-clockwise rotation of float 15. The positive pulse generated in the output of differentiating circuit 32 and OR circuit 34 should be added to the reversible accumulator 36. Whenever the voltage induced in winding 22 is at a low level, the voltage level at terminal J and one input of AND circuit 40 will be at an up level. Therefore, when the induced voltage level within winding 23 changes from low to high, a positive pulse is generated at terminal H and applied to the other input of AND circuit 40. As a result, a positive pulse is passed through OR circuit 48 and applied to the one input terminal of trigger 50 so as to place reversible accumulator 36 in its summing mode. At the same time, the positive pulse generated at terminal H will pass through OR circuit 34 and delay 52 in a manner so as to apply an input pulse to summing accumulator 36.

While all of the possible conditions which the reversible accumulator and related logic circuit have been described under normal operating conditions, it is anticipated that the annular float 15 will rotate in a given direction for a subsantial period of time involving the storage of a considerable number of pulses within the accumulator.

The trigger 50 is of a conventional construction and of the type such that when a voltage having an up level is applied to its one output terminal, its one output terminal is driven to an up voltage level; and when an up voltage level is applied to its zero input terminal, its zero voltage output terminal will be driven to an up voltage level. The delay 52 may also be of a conventional construction as exemplified by a capacitor.

While a magnetic type of pickup has been shown in FIG. 2, it should be clear that many alternate techniques might be used without departing from the teachings of the present invention. For example, either a variable conductive device or a variable capacity type device might be used for this purpose.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A viscous fluid float type accelerometer comprising a sealed cylinder adapted to contain a viscous fluid, a rotatable member within a first half of said cylinder, another rotatable member within the second half of said cylinder, means for rotating said rotatable members at a constant rotational velocity and in opposite directions about a single axis along which acceleration is to be measured, an annular float disposed between the periphery of said chamber and said rotatable members for displacement along said axis in accordance with the time integral of the acceleration being measured, said annular float rotating at a velocity commensurate with the magnitude of the displacement of said float and with the direction commensurate with the displacement of said annular float along said axis.

2. An integrating accelerometer comprising a sealed cylindrical chamber having its long dimension along an axis in the direction of the acceleration to be measured, a first drum mounted for rotation about said axis within one-half of said cylindrical chamber, a second drum mounted for rotation about said axis within the other half of said chamber, a viscous fluid filling the void within said chamber, said drums being rotated at the same constant rotational velocity and in opposite directions, an annular float having a length substantially less than the length of said fluid filled sealed cylindrical chamber and emersed therein for displacement along said axis in accordance with the time integral of the acceleration being measured, said annular float being forced into rotation at a velocity commensurate with the magnitude of the displacement of said float along said axis and with a direction commensurate with the direction of displacement.

3. An acceleration measuring device as set forth in claim 2 wherein an electronic digital means is utilized for measuring the rate and direction of rotation of said annular float.

4. An acceleration measuring device as set forth in claim 3 wherein a reversible electronic accumulator means is made responsive to said electronic digital means for accumulating the double integral of the acceleration being measured along the axis of said cylindrical chamber.

5. An integrating accelerometer comprising a sealed cylindrical chamber adapted to contain a viscous fluid having a journal within each end section of said chamber, said journals being oriented along an axis in the direction of the acceleration to be measured, a first rotatable drum mounted within one of said journals, a second rotatable drum mounted within the other of said journals, the length of said first and second rotatable drums being less than one-half the length of said sealed cylindrical chamber, a cylindrical shell having a length substantially less than the length of said sealed cylindrical chamber acting as an annular float for displacement in accordance with the integral of the acceleration being measured, drive means acting to rotate said first drum at a constant velocity in a clockwise direction and rotate said second drum in a counter-clockwise direction, the rotation of said first and second drums acting through said viscous fluid to rotate said annular float about the axis along which the acceleration is being measured with a rotational velocity commensurate with the magnitude of the displacement of said float and with a direction commensurate with the direction of the displacement of said float and electronic digital means for measuring the rate of rotation of said annular float and its direction of rotation.

References Cited in the file of this patent

UNITED STATES PATENTS

| | | |
|---|---|---|
| 2,819,053 | Pope | Jan. 7, 1958 |
| 2,840,366 | Wing | June 24, 1958 |